United States Patent [19]

Sevrain et al.

[11] Patent Number: 5,413,566
[45] Date of Patent: May 9, 1995

[54] LINE CLAMP

[75] Inventors: Christophe J. P. Sevrain, Ridgefield; Carl D. Beckett, Vancouver, both of Wash.

[73] Assignee: Micropump Corporation, Vancouver, Wash.

[21] Appl. No.: 33,621

[22] Filed: Mar. 16, 1993

[51] Int. Cl.[6] .............................................. A61M 5/00
[52] U.S. Cl. .................................. 604/248; 604/250; 604/34; 251/9
[58] Field of Search ............... 604/246, 248, 250, 4–7, 604/32–34; 128/DIG. 26; 251/9

[56] References Cited

U.S. PATENT DOCUMENTS

| | | | |
|---|---|---|---|
| 3,248,499 | 4/1966 | Young . | |
| 3,523,523 | 8/1970 | Reich et al. | 604/250 |
| 3,694,782 | 9/1972 | Ray . | |
| 3,817,237 | 6/1974 | Bolduc | 604/250 |
| 3,985,134 | 10/1976 | Lissot et al. | 604/34 |
| 4,061,142 | 12/1977 | Tuttle . | |
| 4,190,536 | 2/1980 | Grimsrud . | |
| 4,227,164 | 10/1980 | Kitahara . | |
| 4,397,642 | 8/1983 | Lamadrid | 251/9 |
| 4,601,702 | 7/1986 | Hudson | 604/30 |
| 4,616,801 | 10/1986 | Cewers et al. | 251/9 |
| 4,643,714 | 2/1987 | Brose . | |
| 4,696,669 | 9/1987 | Menhusen | 604/34 |
| 4,795,929 | 1/1989 | Elgass et al. . | |
| 4,878,646 | 11/1989 | Edelman et al. | 251/9 |
| 4,928,028 | 5/1990 | Leibovich . | |
| 5,034,670 | 7/1991 | Tominaga . | |
| 5,067,359 | 11/1991 | Flaig et al. . | |
| 5,082,025 | 1/1992 | Deumes et al. | 604/248 |
| 5,146,126 | 9/1992 | Hutchins . | |
| 5,221,268 | 6/1993 | Barton et al. | 604/250 |
| 5,254,083 | 10/1993 | Gentelia et al. | 604/250 |

FOREIGN PATENT DOCUMENTS 0452234 10/1991 France .

OTHER PUBLICATIONS

Communication, European Search Report and Annex to European Search Report dated Jul. 21, 1994 (3 pp.).

*Primary Examiner*—C. Fred Rosenbaum
*Assistant Examiner*—Chalin Smith
*Attorney, Agent, or Firm*—Klarquist Sparkman Campbell Leigh & Whinston

[57] ABSTRACT

A clamp for occluding a flexible tube comprising a permanent magnet rotary actuator coupled to a rotatable cam. A spring-biasing mechanism is provided to counteract the rotation of the rotary actuator and to return the rotatable cam to a pre-determined position when power is withheld from the rotary actuator.

2 Claims, 6 Drawing Sheets

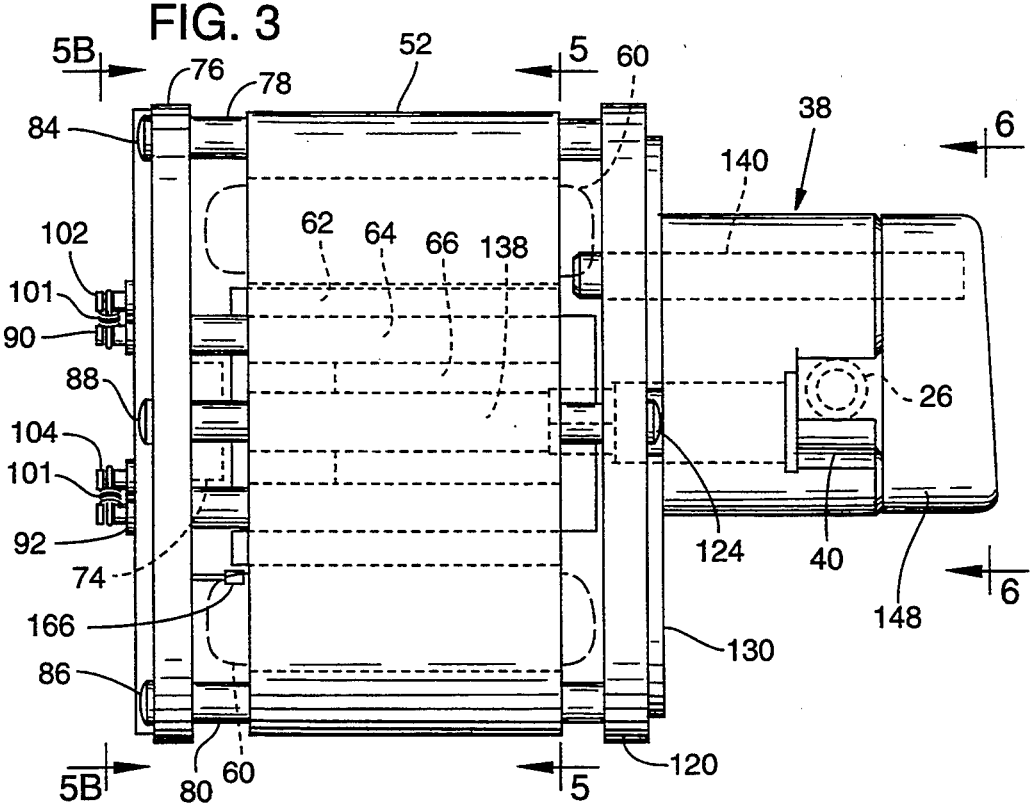
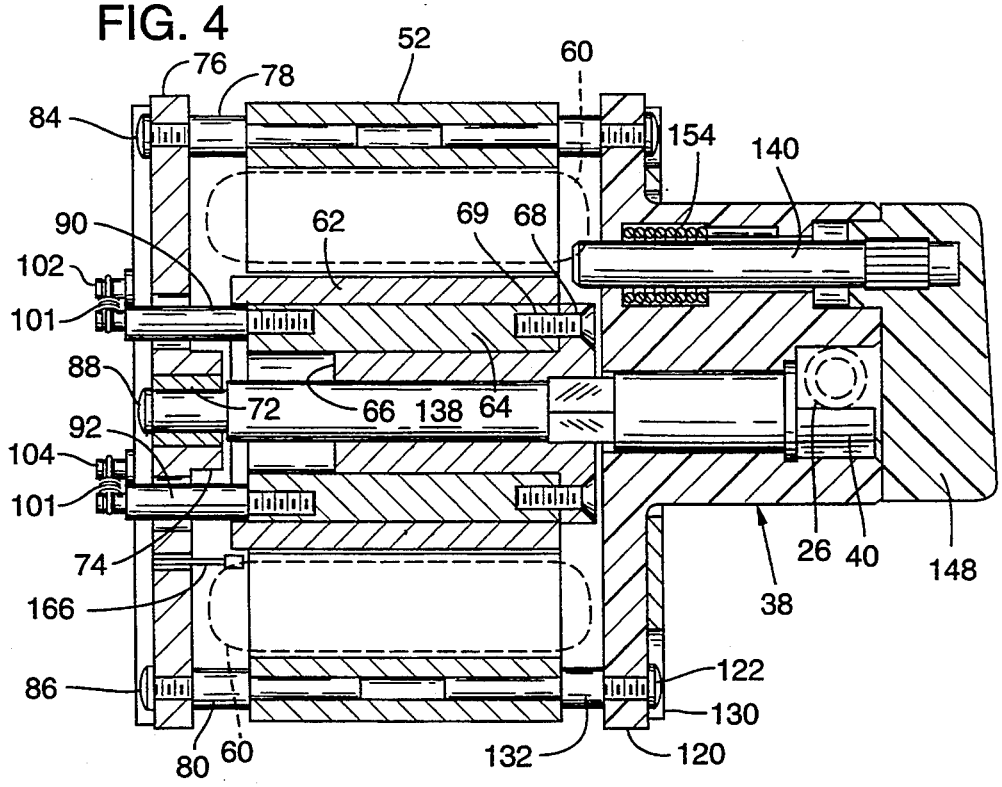

LINE CLAMP

FIELD OF THE INVENTION

This invention relates generally to an apparatus for controlling the flow of a fluid in a flexible tubing. It is particularly well suited for controlling blood flow in single needle hemodialysis machines and related medical and biotechnological applications.

BACKGROUND OF THE INVENTION

The control of fluid flow through flexible tubing is required in many technical fields of endeavor, including routine laboratory practices, and the chemical, biotechnological and medical fields. The present invention relates to an apparatus for clamping flexible tubes in a controlled manner so as to occlude the tube and thereby prevent the flow of fluid through the tube. The disclosed apparatus was developed in response to the need for an improved clamping apparatus for use in single needle hemodialysis, but will find widespread utility in many other applications.

Hemodialysis machines serve as artificial kidneys for extracting waste material from the blood of a patient whose kidneys do not function properly. Generally, this waste is removed from the patient's blood by dialysis through semipermeable barriers into a dialysate. This dialysis is performed in a hemodialysis machine. It is therefore required that blood be removed from the patient, conveyed to the hemodialysis machine for treatment and then returned to the patient. This is achieved by means of flexible tubes and a pump mechanism, such as a peristaltic pump.

In one type of hemodialysis, termed single needle hemodialysis, a single venipuncture needle is inserted into a vein in the patient's arm. This needle is used both to remove untreated blood from the patient and deliver it to the hemodialysis machine and to return treated blood to the patient from the hemodialysis machine. This blood removal and return is performed through two separate flexible tubes, both of which are operably attached to the single needle.

To avoid co-mingling of the treated and untreated blood, the dialysis machine operates on a dual phase cycle: in one phase, termed the arterial phase, blood is withdrawn from the patient through the needle and passed through one of the tubes, termed the arterial line, into the dialysis machine for treatment. During this arterial phase, the other tube, termed the venous line, is occluded. In the other phase, termed the venous phase, treated blood is pumped from the dialysis machine through the venous line, and returned to the patient through the needle, while the arterial line is occluded. The operation of a typical single needle hemodialysis apparatus is disclosed in U.S. Pat. No. 4,643,714. The pumping action required to convey the blood to and from the patient is typically performed by a peristaltic pump, such as is disclosed in U.S. Pat. No. 4,190,536.

The arterial and venous lines are typically made of flexible tubing. Clamps are used to occlude the arterial or venous lines as appropriate to the phase of the machine. The occlusion of the tubes may be achieved by means of a single clamp (as disclosed in U.S. Pat. No. 4,061,142) or by two separate clamps—an arterial line clamp and a venous line clamp. The clamp on the arterial line is normally open; that is, when power is withheld from the clamp, the tubing is open. For safety reasons however, the venous line clamp must be occluded when the clamp is not receiving power (hence the venous line clamp may also be referred to as the "safety clamp").

In the usual course of operation, a microprocessor within the hemodialysis machine regulates the cycling of blood flow and controls the opening and closing of the arterial and venous line clamps. Typical clamping devices used to occlude the flexible tubing make use of a solenoid and lifting magnets which are connected to a clamping mechanism. These clamps typically require large amounts of power, leading to the generation of significant amounts of heat during operation. These solenoid clamps have been known to fail because of elevated temperatures during operating conditions. Furthermore, conventional solenoid clamps also generate considerable noise during operation, providing, in addition to the dialysis itself, an additional irritation to the patient. A further disadvantage of conventional solenoid-based clamps is that these clamps respond relatively slowly to signals received from the hemodialysis machine microprocessor. Delays in opening or closing the clamps can result in admixing of treated and untreated blood.

It is therefore an object of this invention to provide a clamp suitable for occluding flexible tubes, which operates on relatively low power and generates less heat.

It is a further object of this invention to provide a clamp suitable for occluding flexible tubes wherein the clamp responds rapidly to a received signal.

It is also an object of this invention to provide a clamp suitable for occluding flexible tubes in a single needle dialysis apparatus and similar applications, which generates less noise and attendant irritation to the patient.

These and other objects and advantages of the present invention will be more fully apparent from the following description and drawings referred to therein.

SUMMARY OF THE INVENTION

The present invention provides a line clamp apparatus useful for occluding a flexible tube. The line clamp employs a permanent magnet rotary actuator operably connected to a rotatable cam that provides a clamping action to occlude the flexible tube.

In one embodiment, the apparatus is useful as an arterial line clamp for a single needle hemodialysis machine. In this embodiment, the tubing is normally open. When power is supplied to the rotary actuator, the rotatable cam is caused to rotate and occlude the tubing. This rotary action opposes and overcomes a biasing force generated by a spring mechanism; when power is removed from the rotary actuator, the spring mechanism rotatably returns the cam to an "open" position such that fluid is allowed to flow through the tube.

In a second embodiment, the apparatus is useful as a venous line clamp (also termed a "safety clamp") for a single needle hemodialysis machine. In this embodiment, the tubing is normally occluded. This is achieved by means of a spring mechanism operably connected to the rotatable cam. This spring mechanism holds the rotatable cam in a "closed" position such that the tubing is normally occluded. When power is supplied to the rotary actuator, the rotatable cam is caused to rotate against the force of the spring mechanism to open the flexible tube and permit fluid flow therethrough.

In a preferred embodiment of the invention, the permanent magnet rotary actuator comprises a permanent magnet rotatably supported within a housing and a stator fixed in the housing so as to be diametrically separated from the outer peripheral surface of the permanent magnet, the stator having coils wound on projections extending toward the permanent magnet. In this preferred embodiment, a drive shaft is coupled to the permanent magnet and operably attached at one end to the rotatable cam. Thus, when power is supplied to the coils wound on the stator, the magnetic field generated by the current passing through the coils causes the permanent magnet to rotate. Rotation of the permanent magnet produces a rotation of the drive shaft and thereby, a rotation of the rotatable cam. Thus, application of power to the rotary actuator leads to rotation of the rotatable cam.

The present invention therefore makes use of a permanent magnet direct drive device rather than an inductive solenoid device typical of conventional line clamps. In a preferred embodiment of the present invention, the stator in the permanent magnet rotary actuator is provided with six circumferentially spaced electromagnets which correspond to six pole portions of alternating polarity on the permanent magnet. When power is supplied to the electromagnets, the permanent magnet and the attached drive shaft rotate through a theoretical maximum of 60°. This rotation is directly translated into rotation of the rotatable cam.

In preferred embodiments, a rotation-limiting means is provided to limit the rotation of the permanent magnet and drive shaft. In more preferred embodiments the rotation limiting means comprises at least one pin connected to the permanent magnet and at least one raceway defined by a plate into which the pin projects. In a preferred embodiment, the pins are protected by a plastic sleeve which serves to deaden the noise produced. In an alternative embodiment, the rotation limiting means comprises a rotation-limiting cam operably connected to the permanent magnet and a fixed stop that restricts the movement of the rotation-limiting cam.

In other embodiments, a resistance means for opposing the movement of the tube occluding cam is provided. In one embodiment, useful, for example, as an arterial line clamp for a single needle hemodialysis apparatus, this resistance means maintains the tube occluding cam in an "open" position such that the tubing is non-occluded when power is withheld from the clamp. In another embodiment, useful, for example, as a venous line clamp for a single needle hemodialysis apparatus, the resistance means maintains the tube occluding cam in a "closed" position (tube occluded) when power is withheld. In a preferred embodiment, the resistance means comprises at least one spring having two ends and being operably connected at one end to a fixed plate and operably connected at the other end to the permanent magnet.

The direct drive design of the present invention efficiently generates sufficient torque to counter-act the spring-biasing mechanism. This allows the actuator to function on a lower power supply than conventional solenoid line clamps, alleviating the significant heat generation problems associated with these prior clamps.

BRIEF DESCRIPTION OF THE DRAWINGS

FIG. 3 is an enlarged, somewhat schematic side view of the arterial line clamp of FIG. 2 in an assembled condition.

FIG. 4 is a vertical sectional view of the arterial line clamp of the present invention.

DESCRIPTION OF PREFERRED EMBODIMENT

Figure 1:
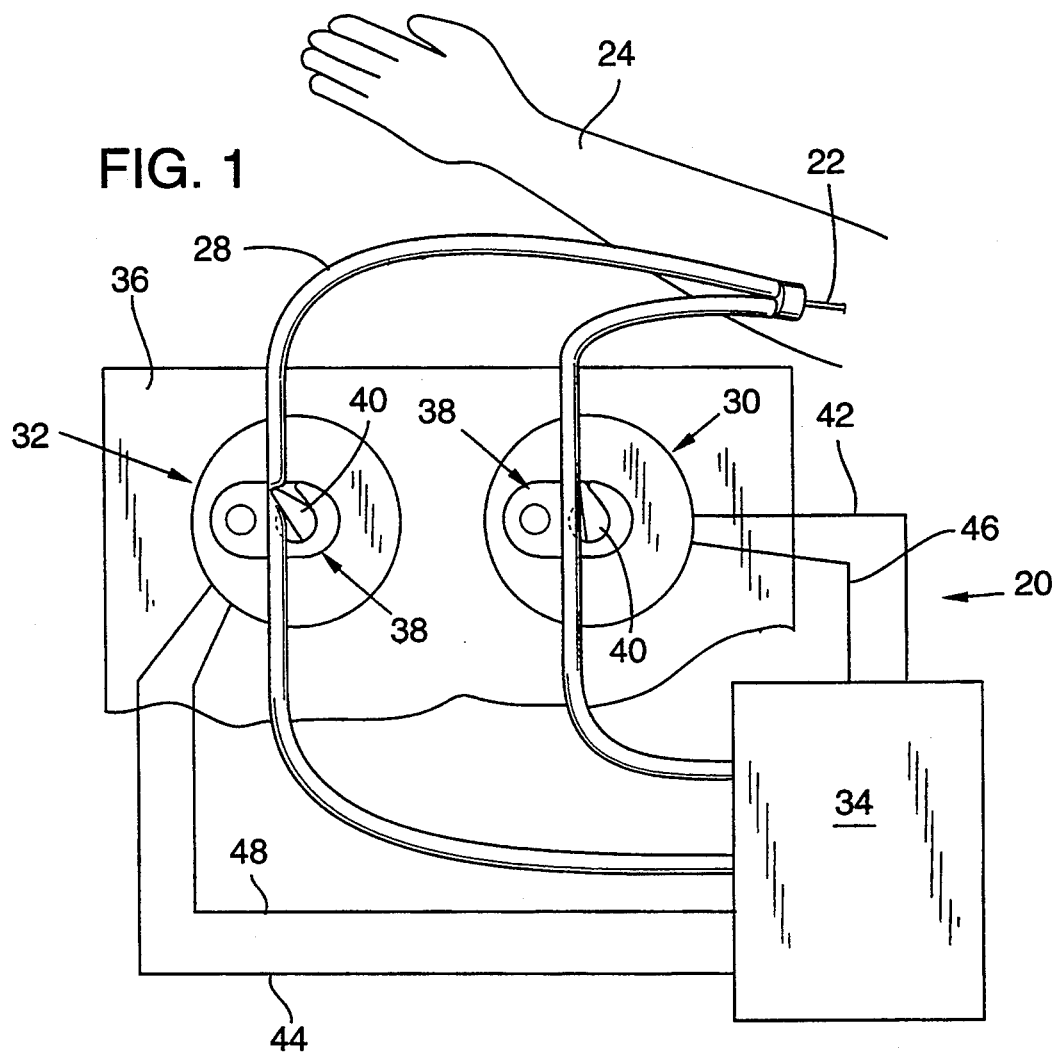
FIG. 1 is a schematic view of the clamping portion of a single needle hemodialysis machine as used with the present invention.

FIG. 1 illustrates the use of the line clamps of the present invention in the context of single needle hemodialysis. This use is provided by way of illustration only, and is not intended to designate a limitation on the use of the present invention. The line clamps of the present invention may be used in many contexts in which the control of fluid flow through a flexible tube is required, and is particularly well suited for medical and biotechnological applications.

Referring to FIG. 1, there is shown a schematic illustration of a single needle hemodialysis apparatus 20 for removing untreated blood from a patient through a single needle 22 inserted into a vein (not shown) in a patient's arm 24. An arterial line 26 is connected to the needle 22 for removal of blood from the patient. A venous line 28 also is connected to the needle 22 for returning treated blood to the patient. An arterial line clamp 30 and venous line clamp 32 are located on the arterial and venous lines, 26 and 28, respectively, for alternately blocking flow through these lines. Blood removed from the patient is pumped through arterial line 26 to the hemodialysis machine 34 where it is treated (not shown) and returned to the patient through venous line 28. Pumping is achieved by a pumping means, such as a peristaltic pump (not shown), located within the hemodialysis machine 34. The hemodialysis machine typically is contained within a frame or housing 36.

The arterial and venous line clamps, 30 and 32, are mounted onto an outer surface of frame 36 in a conventional manner. Each of the line clamps has a tube receiving member 38 which provides a channel or seat to retain a portion of the line clamp, again in a conventional manner. Tube receiving member 38 serves to hold the flexible tube in place next to a rotatable cam (or "tube-occluding cam") 40 which, when rotated in one direction, occludes the flexible tube by pinching it against a side wall of the channel. In FIG. 1, the rotatable cam 40 of arterial line clamp 30 is shown in the open position such that blood may flow through arterial line 26 to the hemodialysis machine. In contrast, the rotatable cam 40 of venous line clamp 32 is shown in the closed position, thereby occluding venous line 28 and preventing the flow of processed blood to the patient.

Arterial line clamp 30, venous line clamp 32 and the peristaltic pump are electrically connected to receive signals from a microprocessor based electronic controller (not shown) within the hemodialysis machine 34 in a manner known in the hemodialysis art. Arterial line clamp 30 receives control signals from the controller through an electrical line 42, and venous line clamp 32 receives control signals from the controller through electrical line 44. The controller receives feedback electrical signals from Hall sensors (not shown) in arterial line clamp 30 and venous line clamp 32 through electrical lines 46 and 48 respectively. Signals received by the controller through lines 46 and 48 provide information on the respective positions of both rotatable cams 40. Thus, in FIG. 1, electrical line 46 provides a signal to the controller indicating that arterial line clamp 30 is in the "open" or non-occluded position, while electrical line 48 provides a signal to the controller indicating that venous clamp 32 is in the "closed" or occluded position.

The operation of one type of single needle hemodialysis apparatus, including the mechanism by which the controller alternates between venous and arterial phases, is further described in U.S. Pat. No. 4,643,714, herein incorporated by reference.

Figure 2:
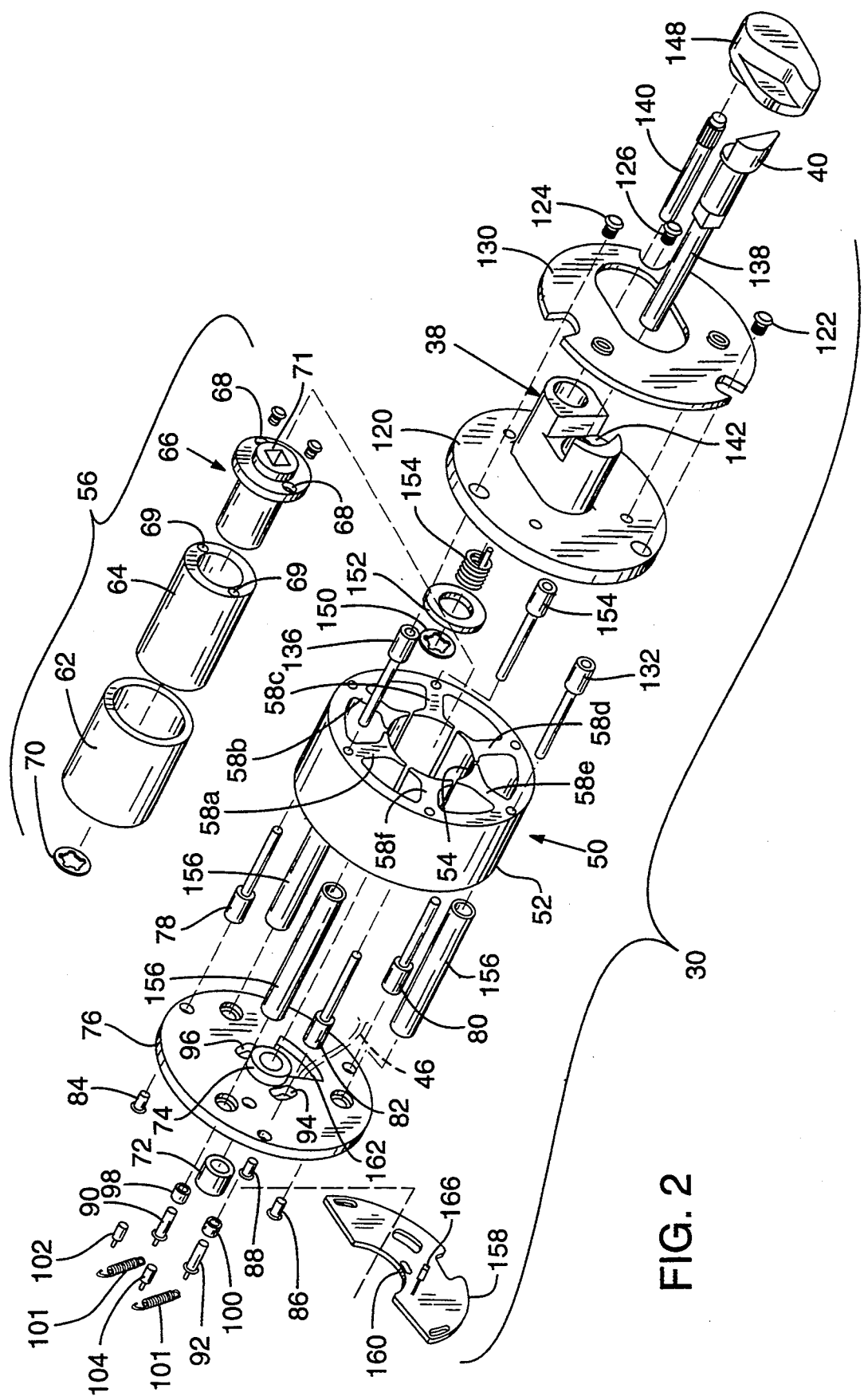
FIG. 2 is an exploded perspective view of an arterial line clamp in accordance with the present invention.

FIG. 2 shows an exploded view of arterial line clamp 30 according to one embodiment of the present invention. Clamp 30 includes a rotary actuator for automatically generating a clamping torque in response to signals from a microprocessor or other control means. The rotary actuator includes a stator 52 that defines a hollow cylindrical bore 54 into which a permanent magnet-drive shaft assembly 56 is located. In the preferred embodiment of the present invention, stator 52 is provided with six inwardly protruding projections 58a–58f, circumferentially spaced from one another around bore 54.

Figure 5:
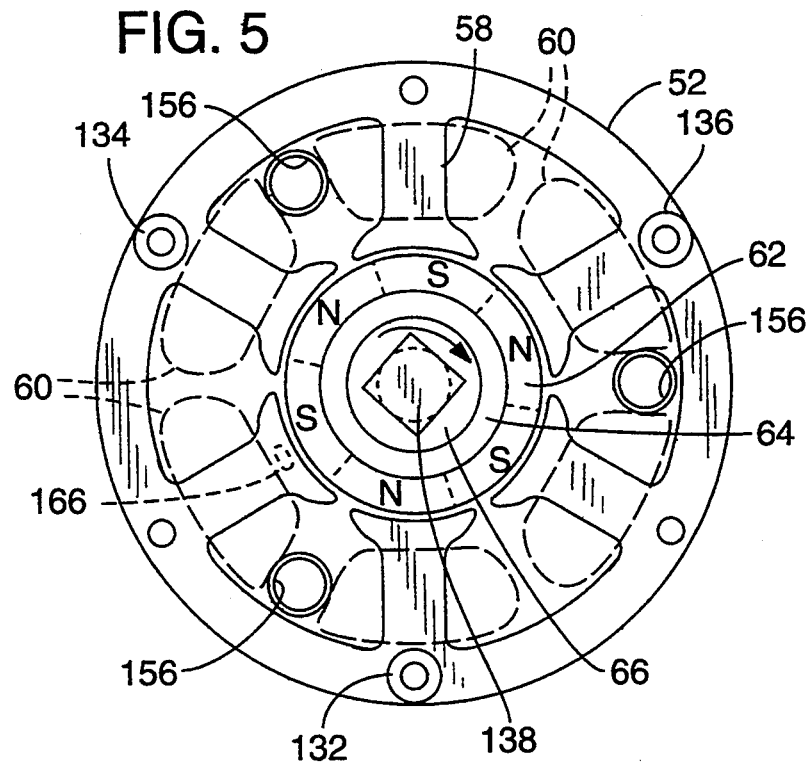
FIG. 5 is a horizontal sectional view taken along line 5—5 of FIG. 3, showing a permanent magnet rotary actuator of the present invention.
Figure 5A:
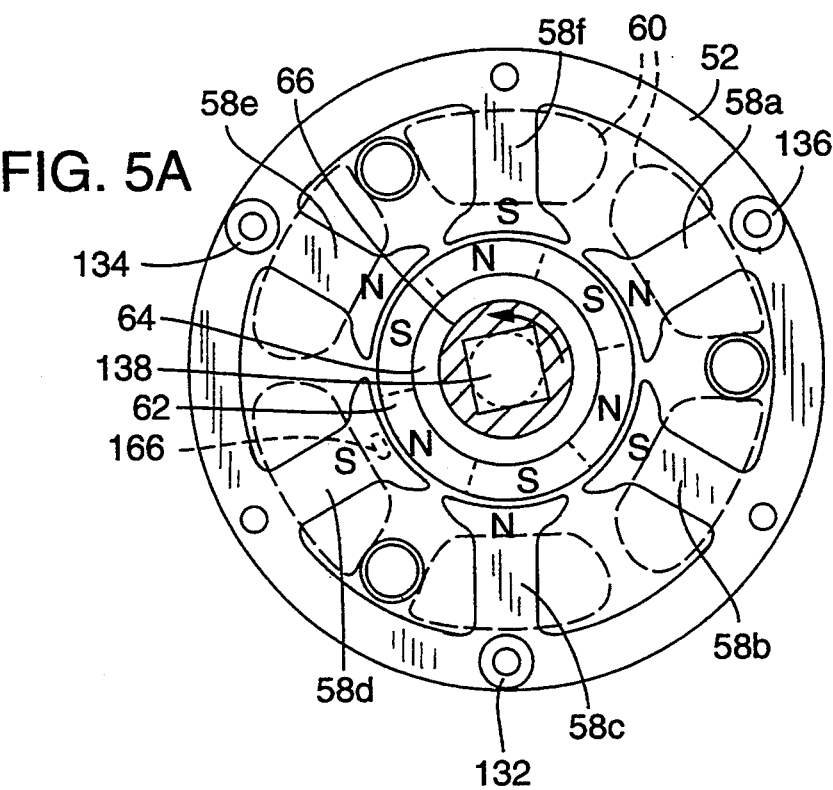
FIG. 5A is a view similar to FIG. 5 showing the rotary actuator in a displaced rotary position.

As shown in FIGS. 5 and 5A, projections 58a–58f are each wrapped with respective coils 60a–60f in a conventional manner to form six electromagnets. In the embodiment illustrated, coils 60a–60f are formed by winding a single length of wire around each projection. The winding direction alternates around successive projections such that coils 60a, 60c and 60e are (for example) wound clockwise and coils 60b, 60d and 60f are wound counterclockwise. Typically, each coil will comprise approximately 350 windings of the wire. In the preferred embodiment illustrated, a suitable wire would be 28 gauge single build insulated thermal class 155 (with a maximum diameter of 0.38 mm, 58.6 ohm resistance per 1000 feet at 20° C).

As so arranged and wound, the coils 60a–60f form a coil means in which diametrically opposed coils, when energized, have opposite polarities and adjacent coils have opposite polarities, such that the projections produce circumferentially alternating north, south magnetic poles. The stator 52 and its component projections 58a–f are formed of non-permanent, but magnetizable material such as soft iron.

Referring again to FIG. 2, the permanent magnet-drive shaft assembly 56 comprises a cylindrical permanent magnet rotor 62, cylindrical backing sleeve 64 and drive shaft insert 66. The permanent magnet rotor defines a cylindrical bore into which the cylindrical backing sleeve 64 is snugly press fit or otherwise secured, the outer diameter of the backing sleeve being slightly less than the inner diameter of the magnet rotor. The cylindrical backing sleeve 64 also defines an internal cylindrical bore into which the drive shaft insert 66 is inserted, again with the outer diameter of the shaft insert being slightly less than the inner diameter of the backing sleeve. The drive shaft insert has a radially expanded collar which rests against an end wall of the backing sleeve when the drive shaft insert is inserted therein. The drive shaft insert is fixedly fastened to the backing sleeve by a pair of screws passing through openings 68 in the collar of the drive shaft insert and then threading into corresponding aligned threaded openings 69 in the backing sleeve. The backing sleeve and drive shaft insert assembly is then inserted inside rotor 62 to form part of assembly 56.

Assembly 56 also includes a drive shaft 138 which is inserted coaxially into the internal bore of shaft insert 66. The drive shaft has a central portion of square cross section which is seated in a complementary shaped square opening provided in a raised end portion 71 (FIG. 2) of shaft insert 66, thereby preventing the drive shaft from rotating relative to shaft insert 66. Hence, the permanent magnet drive shaft assembly, including magnet 62, backing sleeve 64, shaft insert 66, drive shaft 138 and cam 40 coupled to the operative end of shaft 138, rotates as a unit.

This drive shaft assembly is rotatably supported by a bearing 72 seated within a bearing sleeve 74. Sleeve 74 in turn is secured to central portion of a bearing plate 76. More specifically, the foregoing drive shaft assembly is rotatably supported at a protruding end portion of drive shaft 138 which is journalled in bearing 72, as FIG. 4 illustrates. The drive shaft and other components coupled thereto are retained axially in place by a retainer clip 70 (FIG. 2) fastened on the protruding end portion of the drive shaft just outboard of shaft insert 66.

Bearing plate 76 is attached to stator 52 by standoff rivets 78, 80 and 82 and bearing plate-stator screws 84, 86 and 88 which thread into threaded openings in the heads of the standoff rivets. The rivets are fastened to the stator within appropriately positioned openings (not shown) in a peripheral end wall portion of the stator.

Figure 5B:
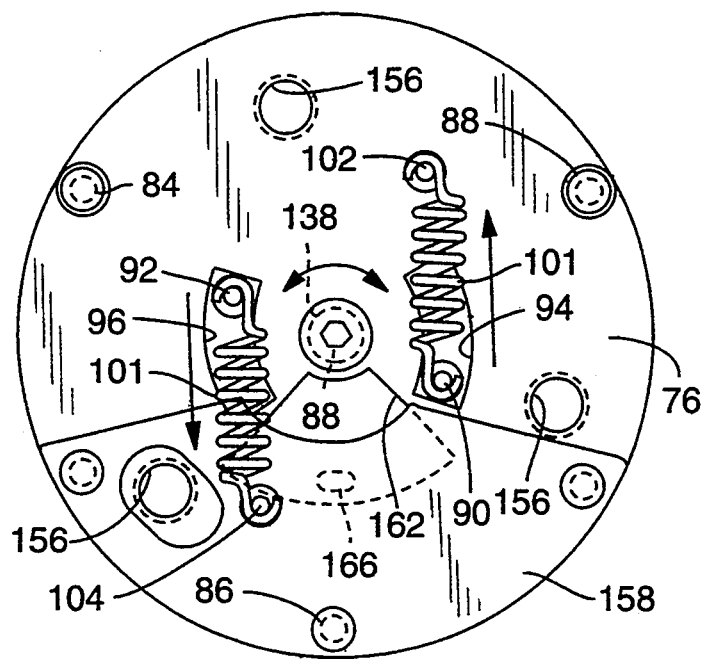
FIG. 5B is an end view taken along line 5B—5B of FIG. 3.

Two steel stop pins 90 and 92 are threadedly fastened into an end wall portion of backing sleeve 64 for rotation therewith. Stop pins 90 and 92 project from the backing sleeve through respective raceways 94 and 96 cut in bearing plate 76. The stop pins are each provided with cushioning means which, in this preferred embodiment, includes respective plastic sleeves 98 and 100. As shown in FIG. 5B, raceways 94, 96 define stop limits for the movement of the stop pins. The raceways, which have an arcuate configuration due to the rotational movement of the rotary actuator, preferably permit the stop pins to travel along a circular path of about 45°. Sleeves 100 muffle the noise created as the stop pins periodically contact the stop limits by preventing the metal to metal contact which would otherwise occur. Referring again to FIG. 5B, a cylindrical spring 101 is attached at one end to each stop pin 90, 92 and at its other end to a respective anchor pin 102, 104. The springs act as a counterbalanced biasing means urging the stop pins to move to the end of their respective raceways closest to the anchor, thereby forcing the rotary actuator coupled thereto to its "open" non-occluded position unless counteracted by a greater rotational force.

Referring again to FIG. 2, three holes are provided in bearing plate 76 into each of which is inserted a mounting tube 156. Each mounting tube is a hollow plastic cylinder which passes between a pair of coils carried by stator 52 and terminates at a base plate 120. The function of the mounting tubes is to allow access to fastening means for fastening base plate 120 to a mounting plate 130.

More specifically, base plate 120 is mounted proximate to one side of stator 52 by means of standoff rivets 132, 134 and 136, and base plate stator screws 122, 124 and 126 which thread into respective heads of rivets 132, 134, 136. Mounting plate 130 in turn is attached to the base plate 120 by means of screws (not shown) passing through the mounting tubes 156 and threading into the inboard side of the mounting plate. Tubes 156 provide access openings for a screwdriver to engage the screws without contacting and possibly damaging coils 60.

Referring also to FIGS. 3 and 4, the tube receiving member 38 defines two parallel cylindrical bores, one of which is coincident with the longitudinal center axis of drive shaft 138. This coincident bore seats the drive shaft, while the other offset bore seats a cover shaft 140 to which a tube cover 148 is pivotally mounted. Tube receiving member 38 also defines a complementary shaped groove 142 (FIG. 2) into which rotatable cam 40 nests to provide clearance for the adjacent flexible tube. When the cam is located flush in the groove, the cam and tube receiving member 38 together form a channel with substantially parallel sides to laterally retain the flexible tube. Once flexible tube 26 is seated in this channel, cover 148 is pivoted on its supporting cover shaft to a closed position in which the cover overlies the flexible tube to prevent same from being displaced out of the channel. A cover shaft retainer clip 150 (FIG. 2), cover shaft retainer washer 152 (FIG. 2), and cover shaft torsion spring 154 (FIG. 2) are seated on one end of the cover shaft between base plate 120 and stator 52 so as to axially retain the cover shaft in place and provide a biasing torque urging the cover to its closed "tube retained" position.

Referring again to FIG. 2, a semicircular printed circuit board 158 is mounted in a conventional manner to bearing plate 76 on its outboard side. Circuit board 158 has a semicircular notch 160 to provide clearance for some of the components on the outboard side of bearing plate 76. The circuit board carries conventional electronic circuitry known in the art for directing and controlling current flow to stator coils 58a-f of stator 52. Electrical wires 164 joined to the control circuitry on the circuit board 158 pass through appropriate openings in the bearing plate to operably connect to coils 58a-f. The control circuitry on circuit board 158 also receives control signals from the microprocessor (not shown) or other suitable controller through electrical lines such as line 42 (FIG. 1). Also mounted onto the circuit board is a conventional Hall sensor 166. The Hall sensor 166 projects through a slot in the bearing plate in a direction parallel to the center axis of drive shaft 138. Hall sensor 166 is mounted adjacent to the permanent magnet 62 such that it detects the magnetic polarity of the adjacent pole of the permanent magnet. The Hall sensor 166 is electrically connected to the hemodialysis machine microprocessor (not shown) by electrical wiring, such as line 46 in FIG. 1.

The side view of FIGS. 3 and 4 schematically show the Hall sensor positioned generally between one of the stator coils and an adjacent pole portion of magnet 62. It will be appreciated that the Hall sensor is located in the magnetic field of the pole portion so as to detect rotation of the magnet when the adjacent pole orientation changes from north to south (or vice versa). This change in orientation is signalled electrically to the microprocessor which is programmed to associate the particular pole orientation of the magnet with either an "open" or "occluded" status of the clamping cam.

Figure 6:
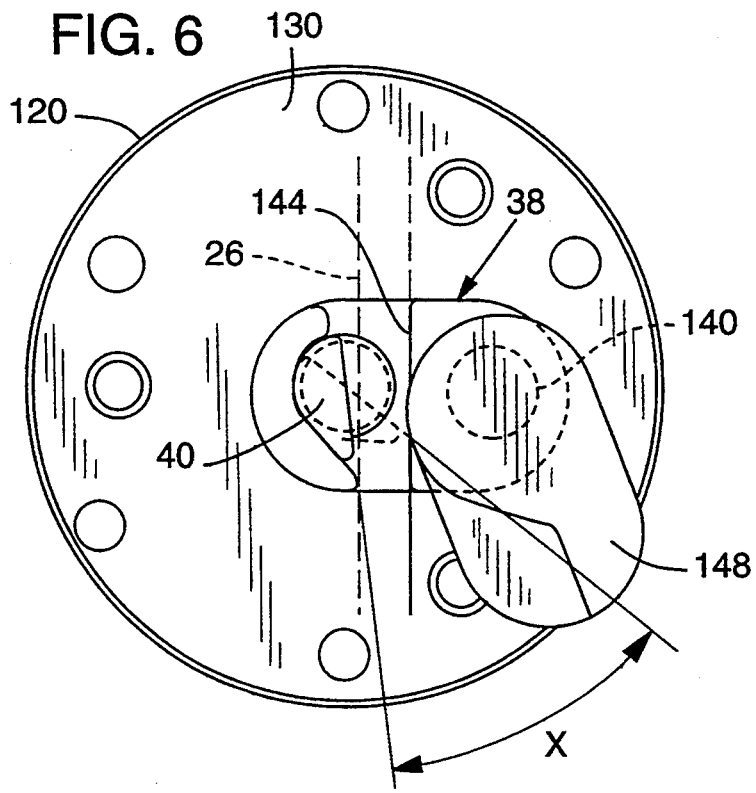
FIG. 6 is an end view taken generally along line 6—6 of FIG. 3, with a top cam cover pivoted open to more clearly show structural details.

Referring to FIGS. 5 and 5A, there are shown horizontal sectional views taken along line 5—5 of FIG. 3, as viewed looking toward bearing plate 76. FIGS. 5 and 5A have illustrative arrows indicating forces applied to the permanent magnet drive shaft assembly. As discussed above, the arterial line clamp is in a normally "open" or non-occluded position, as illustrated by FIG. 5. The arrow of FIG. 5 represents the force applied by springs 101 to the drive shaft assembly. FIG. 5B shows an end view of bearing plate 76 indicating, by means of single-headed arrows, the direction of the biasing action of the springs 101 on the drive shaft 138. When power is not supplied to the stator coils, the springs thus urge the drive shaft assembly to the angular orientation shown in FIG. 5, as determined by the stop limits of raceways 94, 96. This angular orientation of the drive shaft assembly positions cam 40 in the open position, as shown in FIGS. 1 and 6.

When power is supplied to stator coils 58a-58f, in response to signals received from the hemodialysis machine microprocessor through the circuit board 158 and suitable electrical wiring, the electromagnetic fields are activated. The coils are wound so that, when energized, each coil creates an electromagnetic field of the same polarity as the permanent magnet pole portion directly across from the coil thereby applying a repelling magnet force to the permanent magnet. These electromagnetic fields cause the permanent magnet to rotate in a counterclockwise direction, as shown by the arrow in FIG. 5A, to a more dynamically stable position in which the permanent magnet pole portions have aligned themselves with a coil of opposite polarity. This rotational movement produces rotation of the drive shaft 138 and thereby, rotation of the rotatable cam 40 to its occluded position. The torque generated by rotation of the permanent magnet is sufficient to overcome the biasing action of the springs 101 and cause the pins 90 and 92 to move to the limits of the raceways 94 and 96, respectively, such that springs 101 are maximally extended (shown in FIG. 5B). As a result of this rotation, the rotatable cam 40 will turn through a maximum angle of 45 degrees, as illustrated in FIG. 6, and will thereby occlude the flexible tube mounted in the tube retaining member 38. The maximum rotation angle of 45° is defined by the travel of pins 90 and 92 in raceways 94 and 96, respectively (FIG. 5B).

When the microprocessor controller cycles and terminates power to the stator coils 58a-58f, the electromagnet fields dissipate and springs 101 return the permanent magnet and hence the entire drive shaft assembly to the open position of FIG. 5.

In the preferred embodiment of the arterial line clamp described above, the permanent magnet comprises a ferrite magnet, although other types of magnets may also be used. The arterial line clamp produces at least 8 inch pounds of torque, and preferably more than 10 inch pounds of torque.

The rotary actuator of the present invention preferably is supplied with a 24 volt direct current power supply and draws 0.5 amps of current, therefore consuming 12 watts of power.

The above description sets forth a preferred embodiment as an arterial line clamp in which the spring biasing mechanism causes the clamp to be in the "open" or non-occluded position when power is withheld from the electromagnet coils. It will be appreciated that essentially the same design can be utilized to produce a venous or "safety" clamp simply by arranging the drive shaft-spring biasing mechanism such that the spring biasing mechanism causes the clamp to be in a "closed" position when power is withheld from the electromagnet coils. Because of safety considerations in the single needle hemodialysis context, the biasing spring mechanism in a venous clamp context preferably is designed to supply a greater biasing force to the drive shaft assembly than springs used in an arterial clamp design. Thus, when used in a venous clamp context, parameters such as type and strength of magnet, amount of power supplied to the stator coils and cam length relative to its axis of rotation, will be selected in a known manner to produce at least 10 inch pounds of torque on the cam and, preferably at least 14 inch pounds of torque. For example, increased torque may be produced by using a thicker gauge of windings on the stator coils which thereby draw a greater current and produce a correspondingly stronger electromagnetic field. By way of example only, a safety clamp according to this embodiment may be supplied with a 24 volt direct current power supply and draw 1.0 amp of current, therefore consuming 24 watts of power.

In an alternative embodiment, the increased torque may be obtained by utilizing a rare earth permanent magnet in place of the ferrite permanent magnet. Suitable rare earth permanent magnets include samarium cobalt and iron neodymium magnets.

Because the clamps of the present invention operate on relatively low voltage direct current, heat generation problems associated with conventional clamps are avoided. Furthermore, the location and design of the stop mechanism (the steel stop pins mounted with noise-reducing sleeves) produce significantly less noise than conventional clamps. Finally, the clamps of the present invention are more compact, reliable and operate more efficiently than conventional solenoid design clamps.

It will be appreciated that the preferred embodiment described above is illustrative only of the principle of the rotary actuator clamp design, and that variations in this design which rely on the underlying concept set forth herein are possible. For example, the number of electromagnets in the stator and the corresponding number of pole-pairs of the permanent magnet may be increased or reduced. Thus, by way of illustration, by increasing the number of electromagnets and permanent magnet poles, the rotation of the drive shaft is correspondingly reduced.

Alternative Embodiments

Figure 7:
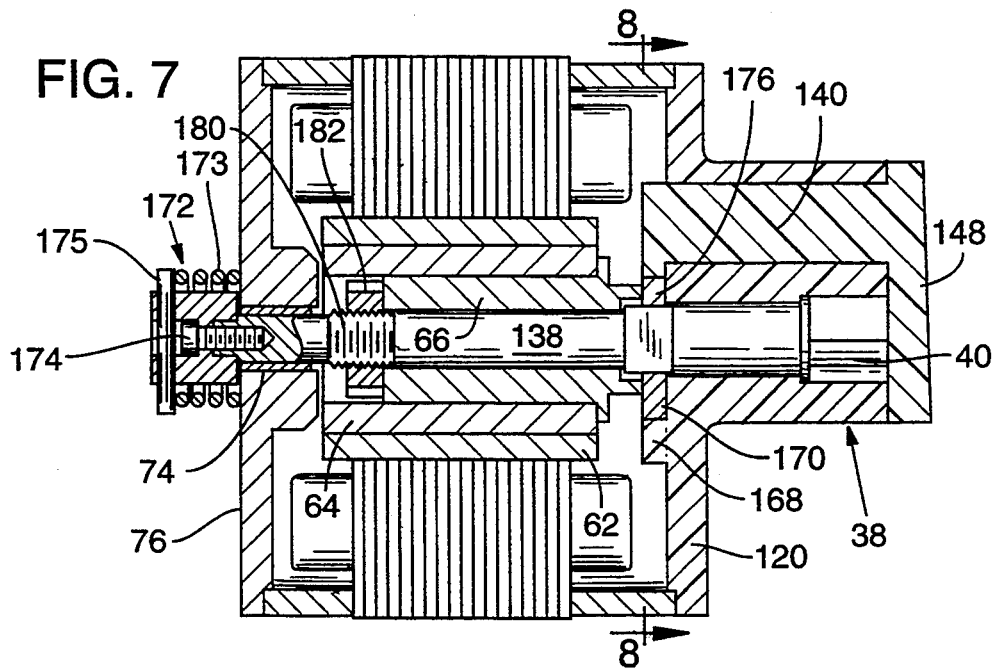
FIG. 7 is a vertical sectional view of a venous line clamp in accordance with an alternate embodiment of the present invention.

FIG. 7 shows a vertical sectional view of a venous line clamp in accordance with one particular alternate embodiment of the present invention. The construction of this embodiment is the same as the embodiments illustrated in FIGS. 2-6, except as otherwise shown in FIGS. 7-10 and discussed below.

FIG. 7 shows an alternative mechanism for mounting drive shaft 138 onto the drive shaft insert 66. In place of the retainer clip 70 (shown in FIG. 2), a nut 180 is threaded onto externally threaded section 182 of drive shaft 138. The nut 180 thereby retains the drive shaft 138, and other components coupled thereto, axially in place in the drive shaft insert 66.

Figure 8:
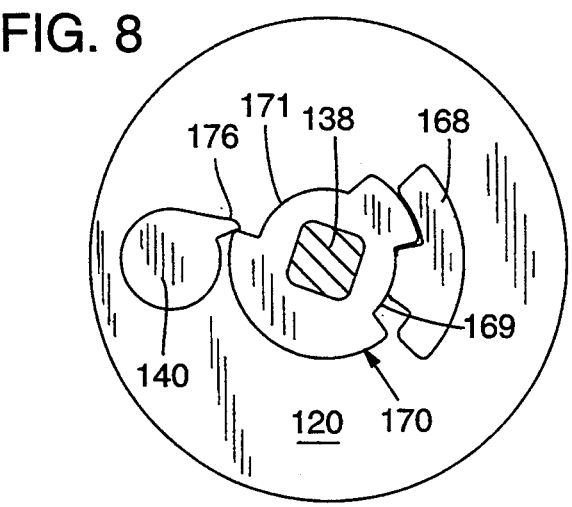
FIG. 8 is a horizontal sectional view taken along line 8—8 of FIG. 7, looking towards the tube receiving member and showing manual cam release and stop mechanisms of the present invention in a first position.
Figure 9:
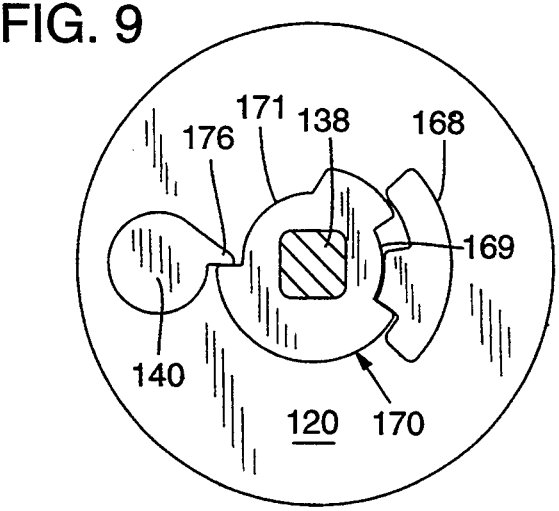
FIG. 9 is an identical view to FIG. 8, but showing the cam release and stop mechanisms in a second position.

In the venous line clamp embodiment shown in FIGS. 7-9, the pin and raceway stop mechanism used to limit the maximum rotation of the drive shaft 138, as described for the embodiments above, is replaced by a fixed stop 168 mounted to or integrally formed on the in-board side of fixed base plate 120. Stop 168 carries a single tooth projection which cooperates with a cam collar (or "rotation-limiting cam") 170 mounted on drive shaft 138. Collar 170 has a complementary shaped square opening to receive a square portion of shaft 138 so that the collar and shaft rotate together. Cam collar 170 is generally circular in section, except for two arcuate notches, a first notch 169 and second notch 171, formed in the periphery of the cam collar (see FIGS. 8 and 9). The angular width of the first notch 169 into which the fixed tooth of the cam collar protrudes therefore limits the degree of rotation of drive shaft 183. In this embodiment, notch 169 and the tooth of stop 168 are sized, configured and arranged to permit shaft 138 and the occluding cam 40 coupled thereto to rotate about 45° between the open and occluded positions.

An angular rotation of the cam shaft of about 45° is selected as a preferred embodiment of the present invention, both for the cam collar herein described and the pins and raceways design described above as the preferred embodiment. This parameter is a function of several obvious variables, including the effective "lever" length of cam 40, configuration of cam 40 and its relative position to the flexible tube, and hence can vary depending upon the design of the line clamp. These parameters are selected such that cam 40 does not pinch or crimp the flexible tube when disposed in the open position, but does effectively and consistently occlude the flexible tube to stop all flow therethrough when disposed in the occluded position without permanently crimping or otherwise damaging the flexible tube.

FIG. 7 also shows an alternative biasing means or spring tension mechanism 172 in place of the dual spring mechanism shown in FIGS. 2 and 5B. Spring tension mechanism 172 includes a helical tension spring 173 which is mounted outboard of bearing plate 76. One end of the helical tension spring is fixedly attached to a shaft extension 175 fastened to drive shaft 138 by means of a screw 174. The other end of the helical spring is fixedly fastened to bearing plate 76. In the venous line clamp embodiment illustrated in FIG. 7, The spring tension mechanism 172 is coupled to drive shaft 138 in a manner such that the drive shaft and its rotatable cam 40 is biased to the tube occluding position. When the stator coils are energized, the resulting electromagnetic force applied to the permanent magnet counteracts the force of the spring tension mechanism to rotate the drive shaft to the open position, as previously explained. For use in an arterial line clamp, the helical spring tension mechanism 172 would be coupled to drive shaft 138 in a manner such that the drive shaft and its rotatable cam 40 would be biased to the tube open position, and rotation of the permanent magnet would cause rotation of the drive shaft and thereby the rotatable cam 40 to the tube occluding position.

Because the venous line clamp illustrated in FIGS. 7-10 is normally "closed," a flexible tube will normally be clamped shut by the rotatable cam when the power to the line clamp is off. It is desirable to be able to manually release or open the cam when the power is off as, for example, when the hemodialysis procedure is completed so that the flexible tube can be withdrawn from the tube receiving member 38. FIGS. 7–9 show a manual cam release means by which cam 40 can be manually rotated into the "open" position to release the flexible tube. More specifically, pivotable cover 148 has an integrally connected cover shaft 140 from which protrudes, at a distal end thereof, an integrally formed cam tooth 176. It will be appreciated that cover 148, shaft 140 and tooth 176 all rotate as a unit. The cam tooth projects into and cooperates with the second notch 171 of cam collar 170.

In FIG. 8, cover 148 is closed to retain the flexible tube in its occluded position (with power off) in the channel and, therefore, is rotated, causing cam tooth 176 is inoperative. To unclamp the flexible tube and remove it from the channel, cover 148 is rotated, causing cam tooth 176 to rotate clockwise to the position shown in FIG. 9. As it rotates, the cam tooth engages cam collar 170, causing drive shaft 138 and occlusion cam 40 coupled thereto to rotate against the bias of the helical spring 173. Cam 40 is thus manually rotated to the "open" position to permit the flexible tube to be removed.

Having described and illustrated the principles of our invention with reference to a preferred embodiment and several variations thereon, it should be apparent that the invention can be modified in arrangement and detail without departing from its principles. Accordingly, we claim all modifications as may come within the scope and spirit of the following claims.

We claim:

1. An apparatus for controlling fluid flow through a flexible tube comprising:
 a frame;
 a tube-receiving member attached to the frame;
 a rotary actuator supported by the frame and including:
 an actuator frame;
 a rotatable portion including a permanent magnet rotatably supported within the actuator frame and having an outer peripheral surface and a drive shaft having first and second ends, said drive shaft being coupled to the permanent magnet for rotation therewith;
 a stator fixedly supported by the actuator frame so as to be diametrically spaced from the outer peripheral surface of the permanent magnet, the stator having inwardly protruding projections extending toward the outer surface of the permanent magnet; and
 coils wound on the projections of the stator;
 means for supplying current to the coils;
 a tube-occluding cam operably attached to the first end of the drive shaft, said cam being rotatable such that it can occlude a flexible tube retained within the tube-receiving member; and
 a rotation limiting means for limiting the rotation of the permanent magnet having at least one pin connected to the permanent magnet and at least one raceway defined by a fixed surface into which the pin projects, the raceway limiting movement of the pin to movement within the raceway.

2. An apparatus for controlling fluid flow through a flexible tube comprising:
 a frame;
 a tube-receiving member attached to the frame;
 a rotary actuator supported by the frame and including:
 an actuator frame;
 a rotatable portion including a permanent magnet rotatably supported within the actuator frame and having an outer peripheral surface and a drive shaft having first and second ends, said drive shaft being coupled to the permanent magnet for rotation therewith;
 a stator fixedly supported by the actuator frame so as to diametrically spaced from the outer peripheral surface of the permanent magnet, the stator having inwardly protruding projections extending toward the outer surface of the permanent magnet; and
 coils wound on the projections of the stator;
 means for supplying current to the coils;
 a tube-occluding cam operably attached to the first end of the drive shaft, said cam being rotatable such that it can occlude a flexible tube retained within the tube-receiving member; and
 a rotation limiting means for limiting the rotation of the permanent magnet having a rotation-limiting cam operably connected to the permanent magnet and a fixed stop that restricts the movement of the rotation-limiting cam.

* * * * *